United States Patent Office 3,260,890
Patented July 12, 1966

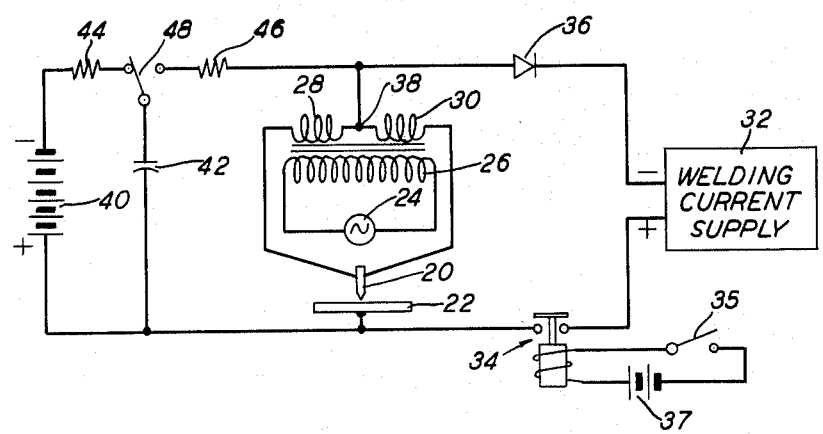
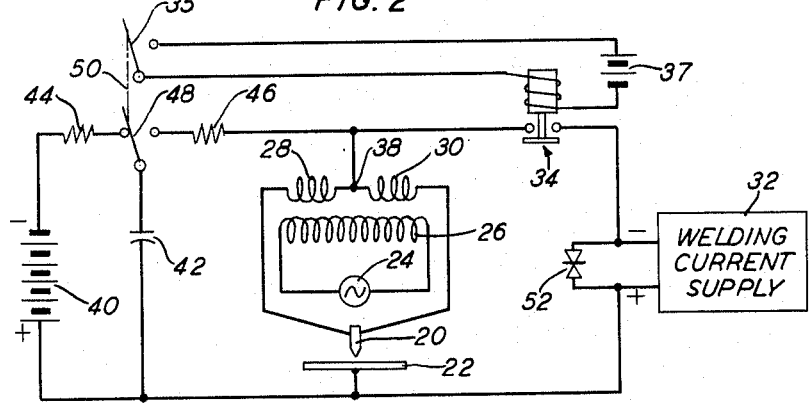
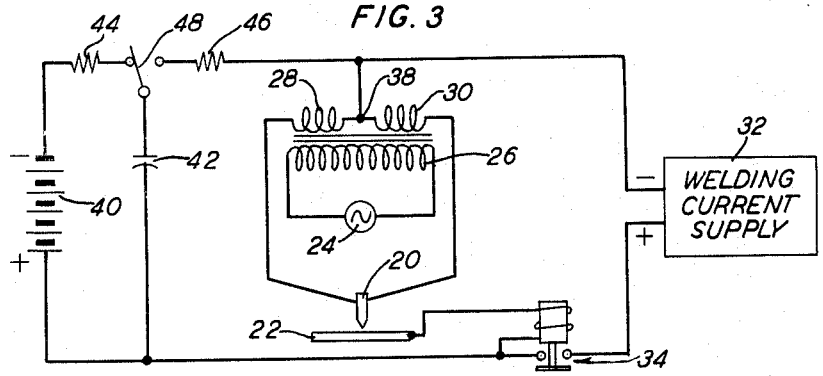

3,260,890
POWER ARC INITIATION BY PREHEAT AND CAPACITOR DISCHARGE
Neil J. Normando, Livingston, and Philip F. Beischer, Belleville, N.J., assignors to Air Reduction Company, Incorporated, New York, N.Y., a corporation of New York
Filed May 24, 1963, Ser. No. 282,925
1 Claim. (Cl. 315—173)

Our invention relates to methods and apparatus for insuring the positive and prompt initiation of a power arc such as used in arc welding and cutting operations.

Conventional current sources for power arcs have an open circuit voltage which is adequate for maintaining an arc once it has been established, but which is inadequate for striking an arc across an operating arc gap between the electrodes which supply current to the arc. Consequently, some provision must be made for striking the arc.

Arc starting or striking can be obtained by using a high voltage spark discharge to break down the arc gap, for example between an electrode and a workpart, and to establish an ionized conductive channel across the arc gap in which the power arc becomes established, provided the arc current source is connected to the arc gap simultaneously with the application of the spark discharge.

The use of high voltage spark discharges for initiating the operation of power arcs is objectionable for various reasons. This procedure will cause some electrode sputtering with a consequent loss of electrode material and contamination of the workpart thereby. Furthermore, this spark discharge technique of arc starting is not as positive and prompt as for example, touch starting due mainly to statistical factors which are inherent in gaseous discharges that are not self-sustaining. Thus, for example, for the same break down voltage, the elapsed time between the application of a spark producing voltage to the arc gap and the production of a spark discharge capable of establishing the power arc may vary from 1/60 to 60 seconds. This uncertainty in starting time of the spark discharge and of the consequent flow of power arc current presents a serious problem when contamination of the electrode or workpart cannot be tolerated and a power arc must be established within a specified small time interval. For instance, in welding or cutting with plural arcs, it is desirable that all of the arcs start in union. If, in welding, the variation in starting times is large, incomplete welds for late starts and burn-throughs for early starts will result and, in arc cutting, failure of all the arcs to start at substantially the same time will result in an imperfect operation of the cutting procedure it is desired to employ.

The use of spark discharges for initiating the operation of power arcs is also objectionable because of interference with radio and television communication. This interference is caused by the harmonic components in each high voltage spark and since these harmonics increase with the pulse amplitude, the pulse voltage must be kept at the minimum value needed for striking and stabilizing the power arc. The usual spark gap oscillator will supply 4,000 volt pulses of a microsecond duration at a frequency rate of one every millisecond so long as the oscillator is in operation. If the pulse magnitude is reduced to a value that keeps radio interference within presently established FCC specifications, the maximum length of arc gap which the spark will jump is too short. Consequently, the pulse generators presently used, even though set to supply the minimum voltage for spark break down of the power arc gap, give rise to some undesirable radio interference.

It is an object of our invention to avoid the use of oscillatory discharges for starting and stabilizing power arcs.

It is also an object to reduce the maximum voltage required in a spark discharge for starting and stabilizing power arcs.

It is another object to prolong the spark discharge at a suitable voltage for arc starting over an interval of time sufficient to ensure the positive establishment of a power arc following the conductive path set up by the spark discharge.

In accordance with our invention, a non-oscillatory spark discharge is employed, which is generated by charging a capacitor from a direct current source and allowing the capacitor to discharge through a resistor of sufficient resistance value to ensure the non-oscillatory nature of the discharge and to prolong the discharge over the desired time interval during which the power arc may be positively established. To facilitate the formation of the power arc, we employ preheating of the arc electrode. The voltage to which the capacitor is charged is of a predetermined value only sufficiently great to positively and promptly start the power arc at the electrode temperature maintained by the preheating means. Provision is made to protect the arc current source from the higher voltage initially present upon the capacitor from the direct current source that charges the capacitor and to prevent the relatively low impedance of the arc current source from appearing across the arc gap at the instant of the spark discharge and thereby reducing the voltage available at the arc gap for breaking down the gap. The capacitor may be left connected to the arc circuit after the power arc has been established or it may be disconnected from the arc circuit and left connected to the charging source until needed for another starting operation. Automatic switching may be provided to insure connection of the arc current source to the arc circuit upon the establishment by the capacitor of a spark discharge across the arc gap.

This invention provides a non-consumable electrode, welding process comprising impressing, upon a work-in-circuit path, starting-arc power from a capacitance which has been precharged to an under-potential suited to be assisted by thermionic heating of the electrode, concurrently electrically isolating a power-arc source from the work-in-circuit path for the duration of the early, relatively high voltage portion of the starting arc discharge, and connecting the power-arc source and the work-in-circuit path before the arc gap has lost a material portion of its initial conductivity, said electrode having been preheated to a thermionic temperature at the arc end, providing assistance to the starting-arc power and power arc power sufficient to ensure that a starting arc and sustained power-arc follow are consistently drawn. This process enables the electrode and work to be at all times spaced apart in the work-in-circuit path so as to define a permanent arc gap. As already indicated, the timing sequence between the starting and power arcs, which can be accomplished by an isolation rectifier in circuit with the power arc source or by a time delay closing device controlling the welding contactor, prevents the relatively low impedance of the power-arc source from being present across the arc gap at initial instant of the starting arc discharge. Otherwise, the undervoltage which is provided for arc starting power would be too greatly reduced to be effective in breaking down the gap initially.

Other features, objects and advantages will appear from the following more detailed description of illustrative embodiments of the invention, which will now be given in conjunction with the accompanying drawings.

In the drawings,

FIG. 1 is a schematic diagram of an illustrative embodiment of the invention; and FIGS. 2 and 3 are schematic diagrams of two modified embodiments.

Referring to FIGURE 1, a welding electrode 20 is shown schematically in operative relation to a workpiece 22. An alternating current source 24 for preheating the electrode 20 to facilitate starting the welding arc is shown connected through a primary winding 26 of a transformer to balanced secondary windings 28, 30, which latter windings are connected in series with the electrode 20 to form an ohmic circuit for heating the electrode 20.

A power circuit for welding current is provided comprising a welding current supply source 32 having its positive terminal connected through a welding contactor 34 to the workpiece 22 and having its negative terminal connected through a unidirectional conductor represented by a diode 36 to the midpoint 38 between the secondary windings 28, 30, and thence through the windings 28 and 30 in parallel to the electrode 20.

The preheating circuit and the welding power supply circuit as shown in FIG. 1 are of the type described and shown in U.S. Patent No. 3,030,495, April 17, 1962, assigned to the same assignee as the present application, with the important difference that the diode 36 is included in the welding power supply circuit to prevent undesirable interaction between the welding power supply and the high voltage arc starting circuit to be described below without impeding the flow of welding current to the arc.

The high voltage arc starting circuit comprises a source 40 of high voltage represented in the figure by a battery, a capacitor 42, a charging resistor 44 and a discharging resistor 46. A single-pole double-throw switching device 48 is shown as a simple knife switch by means of which the capacitor 42 may either be charged through the resistor 44 or discharged through the resistor 46, the windings 28 and 30 in parallel and the electrode 20 to cause a spark discharge between the electrode 20 and the workpiece 22. The resistance of the resistor 44 is preferably made relatively low to permit rapid charging of the capacitor 42 by the source 40 but large enough to limit the initial charging current to a safe value. The resistance of the resistor 46 on the other hand is made relatively larger in order to slow down the discharge and provide time for the welding current supply source 32 to establish a power arc before the end of the spark discharge.

In the operation of the arrangement shown in FIG. 1, heating current for preheating the arc electrode 20 is supplied from the source 24 through the primary winding 26 by transformer action to the series aiding secondary windings 28, 30, serially connected to the electrode. As soon as the electrode has been heated up to the desired temperature, which may take less than a minute, the voltage of the welding current supply 32 may be impressed across the gap between the arc electrode 20 and the workpiece 22 by closing a switch 35 connecting a direct current source 37 to a starting relay to close the welding contactor 34. At the same time or immediately thereafter, the switch 48 may be thrown to place the charged capacitor 42 in circuit with the electrode 20 and workpiece 22 through the resistor 46 and the windings 28 and 30 in parallel. Due to the preheating of the electrode 20 the breakdown voltage of the arc is less than it would otherwise be. This facilitates a spark discharge across the arc gap. The spark discharge is slowed down by an appropriate choice of resistance value for the resistor 46 in order to keep the spark discharge alive for a sufficient interval of time for the voltage of the welding current supply 32 to set up a power arc following the path established between the electrode 20 and the workpiece 22 by the spark discharge. Being non-alternating and prolonged, the spark discharge provides a more favorable condition for establishing the power arc than is afforded by the oscillatory high voltage discharges commonly used heretofore for the same purpose. A time constant of the order of one-tenth of a second and a discharge voltage of about 700 to 1000 volts have been found satisfactory for arc starting by this method.

The arrangement shown in FIG. 2 is similar to that of FIG. 1 except that the diode 36 is omitted and provision is made to ensure that the welding contactor 34 will not be closed until the path for the power arc has been set up by the spark discharge. For this purpose, advantage may be taken of the normal delay in the closing of the welding contactor after power has been applied to its actuating winding. The switches 35 and 48 are mechanically linked as shown by a dotted line 50. It will be evident that a double pole double throw switch may be used to obtain the same result.

In the operation of the arrangement of FIG. 2, when the switch 35 is closed, the switch 48 simultaneously connects the capacitor 42 to the arc circuit to start the spark discharge across the arc. By the time the welding contactor has closed its contact, the welding current source is able to strike the power arc. Meanwhile the welding current supply 32 has been protected from the high voltage on the capacitor 42 because the welding current circuit is open at the welding contactor. At the same time, the welding current source, which is a low impedance, is prevented from appearing across the arc gap at the instant of the spark discharge, when it would reduce the voltage available to break down the arc gap. When the welding contactor closes, the voltage on the capacitor 42 has had time to become reduced to a value that is safe to be impressed upon the welding current source. Added protection may be afforded to the welding current source by shunting the input terminals of the welding current source with a non-linearly conductive element 52 such as a breakdown diode. In this arrangement, the delay time in the closing of the welding contactor must not be so long as to allow the spark initiated arc path to lose a material amount of its conductivity before the welding current source is connected.

FIG. 3 shows a variation in which the welding contactor 34 is actuated by the spark initiated discharge across the arc. In this case, the switch 35 and source 37 are dispensed with. The spark is initiated by operating the switch 48 to connect the capacitor 42 to the arc circuit. The resulting current through the arc flows through the actuating winding of the welding contactor 34 thereby connecting the welding current source to the arc circuit to establish the power arc. Otherwise, the operation is the same as in the case of the arrangement of FIG. 2.

In an illustrative situation in which a time constant of the order of one-tenth of a second has been found sufficient to permit the welding current source to establish a power arc, a one-eighth inch diameter two percent thoriated tungsten electrode was preheated with a preheating current of about four ampers. A welding current of about fifteen amperes was used to maintain a gap of about 0.030 inch to a stainless steel workpiece three-eighths inch thick. Shielding gas of pure argon was provided at a rate of twelve cubic feet per hour. In a circuit arrangement like that of FIG. 1, two silicon rectifiers in parallel were used in place of the diode 36. The combination of silicon rectifiers was capable of withstanding at least 600 volts in the reverse voltage direction while carrying a forward current of about 20 amperes in each rectifier. The direct current source 40 for the capacitor 42 was 750 volts. A series parallel combination of four 800 microfarad capacitors was used as capacitance 42 in the discharge circuit in series with a resistor of 125 ohms resistance.

While switch 48 is shown as a simple knife switch, a thyratron tube or equivalent semiconductor device may be used instead. As shown in the figures, it is desirable that the capacitor 42 be in circuit with the source 40 whenever it is not connected to the arc circuit. In the arrangements of FIGS. 1 and 3, the capacitor 42 may be disconnected from the arc circuit by means of the switch 48 after the power arc has been established and left in the charging circuit ready for instant use in restarting at any subsequent time.

While illustrative forms of apparatus and methods in accordance with the invention have been described and shown herein, it will be understood that numerous changes may be made without departing from the general principles and scope of the invention.

What we claim is:

In the art of electric arc welding and cutting in which a power arc is maintained in a shielding atmosphere comprising essentially argon between a tungsten electrode as a cathode and the work to be welded or cut as an anode the improvement which comprises starting said gas shielded arc by (a) spacing the arc end of said electrode a preselected distance from the work to form an arc gap,
(b) heating the arc end of said electrode by energy supplied by an auxiliary heating circuit to a temperature sufficient to facilitate electron emission therefrom,
(c) charging a capacitor from a first source of current to a potential of the order of from 700 to 1000 volts,
(d) disconnecting said capacitor from said source,
(e) discharging said charged capacitor at a controlled rate through a non-oscillatory circuit including said arc gap having a time constant of the order of $1/10$ second to establish a conductive path across said arc gap with the electrode negative and the work positive, and
(f) following the discharge of said capacitor across said arc gap with a sustained power arc of the same polarity by connecting a second source of current suitable to sustain a power arc across said arc gap when the voltage across said gap decays to a level not substantially higher than the open circuit voltage of said second source, and thereafter maintaining the said capacitor disconnected from said first source.

References Cited by the Examiner

UNITED STATES PATENTS

| | | | |
|---|---|---|---|
| 2,235,385 | 3/1941 | Rava | 315—171 |
| 2,540,015 | 1/1951 | Solow | 315—171 |
| 2,659,036 | 11/1953 | Needham | 315—173 |
| 3,014,155 | 12/1961 | Inoue | 315—173 X |
| 3,030,495 | 4/1962 | Anderson | 219—131 |

DAVID J. GALVIN, *Primary Examiner.*

GEORGE N. WESTBY, *Examiner.*

F. A. ADAMS, S. A. SCHNEEBERGER,
*Assistant Examiners.*